United States Patent [19]

Jacobs

[11] Patent Number: 4,544,680
[45] Date of Patent: Oct. 1, 1985

[54] METHOD OF PREVENTING SCORCH IN A POLYURETHANE FOAM AND PRODUCT THEREOF

[75] Inventor: Barry A. Jacobs, Bethel, Conn.

[73] Assignee: Stauffer Chemical Company, Westport, Conn.

[21] Appl. No.: 682,520

[22] Filed: Dec. 17, 1984

[51] Int. Cl.$^4$ .................. C08G 18/14; C08G 18/18
[52] U.S. Cl. .................... 521/128; 521/129
[58] Field of Search ................. 521/128, 129

[56] References Cited

U.S. PATENT DOCUMENTS

| | | | |
|---|---|---|---|
| 3,138,571 | 6/1964 | Popoff | 260/45.9 |
| 3,157,615 | 11/1964 | Stahly | 260/45.9 |
| 3,567,664 | 3/1971 | Haring | 521/128 |
| 3,637,865 | 1/1972 | Haring | 260/611.5 |
| 3,798,184 | 3/1974 | Cuscurida et al. | 260/2.5 |
| 3,846,351 | 11/1974 | Huffaker et al. | 521/163 |
| 3,931,060 | 1/1976 | Schubart et al. | 260/2.5 |
| 4,021,385 | 5/1977 | Austin et al. | 521/128 |
| 4,130,513 | 12/1978 | Reale et al. | 521/163 |
| 4,143,219 | 3/1979 | Hensch | 521/107 |
| 4,146,687 | 3/1979 | Reale | 521/128 |
| 4,178,420 | 12/1979 | Reale | 521/128 |
| 4,228,247 | 10/1980 | Moore et al. | 521/107 |
| 4,235,975 | 11/1980 | Preston et al. | 521/128 |
| 4,292,411 | 9/1981 | Jourquin et al. | 521/128 |
| 4,363,745 | 12/1982 | Hinze | 521/128 |
| 4,444,676 | 4/1984 | Statton et al. | 521/128 |

FOREIGN PATENT DOCUMENTS 873697  5/1957  United Kingdom .

*Primary Examiner*—Herbert S. Cockeram
*Attorney, Agent, or Firm*—Richard P. Fennelly

[57] ABSTRACT

Incorporation of from about 0.01% to about 5% of an N-alkanoyl-N,N'-dialkyl-phenylenediamine compound (e.g. N-heptanoyl-N,N'-di-sec-butyl-para-phenylenediamine) in a flame retarded polyurethane foam formulation stabilizes the formulation against scorching as the foam is formed therefrom and also improves the indentation load deflection of the foam.

12 Claims, No Drawings

METHOD OF PREVENTING SCORCH IN A POLYURETHANE FOAM AND PRODUCT THEREOF

BACKGROUND OF THE INVENTION

1. Field of the Invention

The present invention relates of a method for stabilizing a flame retarded polyurethane foam against scorching and the product thereof.

U.S. Pat. No. 3,798,184 has suggested that polyurethane foams can be stabilized against scorching caused by dry heat degradation by the incorporation therein of an effective amount for stabilization of a diphenylamineacetone reaction product. That patent indicated that N,N'-di-sec-butyl-p-phenylenediamine, a known antioxidant for natural and synthetic elastomers (e.g., see U.S. Pat. No. 3,138,571, Belgium Pat. No. 778,579 and U.S. Pat. No. 3,157,615), when incorporated by itself in a polyurethane foam, failed to protect the foam from dry heat degradation. Polyurethane foam formulations have contained a variety of phenylenediamines in combination with other functional additives (e.g., see British Pat. No. 873,697 and U.S. Pat. No. 3,194,793), but it has not been realized that the N-alkanoyl-N,N'-dialkyl-phenylenediamine compounds intended for use in the present invention will, unlike N,N'-di-sec-butyl-p-phenylenediamine, prevent scorching in a flame retarded polyurethane foam. Moreover, these substituted N,N'-dialkyl phenylenediamines also improve the indentation load deflection, as measured by ASTM D1564, Method A, of such foams.

The N-alkanoyl-N,N'dialkyl phenylenediamine compounds intended for use herein have the formula:

(H)(R)NC$_6$H$_4$N(R)(COOR$^1$)

wherein R and R$^1$ can be the same or different and are straight chain or branched alkyl, e.g., C$_1$–C$_{10}$ alkyl. The nitrogen atoms are preferably para- on the benzene ring although ortho- and meta- isomers can also be utilized. A preferred compound is N-heptanoyl-N,N'-di-sec-butyl-paraphenylenediamine.

The substituted phenylenediamine compounds intended for use herein are preferably formed by acylating an N,N'-dialkyl phenylenediamine reagent with the appropriate alkanoic acid under any of the well known acylation conditions. The reaction can be carried out at an elevated temperature, normally in the range of from about 100° to 300° C. Alternatively, the phenylenediamine reagent can be reacted with the acid anhydride of the appropriate acid at a temperature of about 20°–200° C. The third method involves reacting the phenylenediamine reagent with the selected alkanoyl chloride at a temperature of about 20°–150° C. If either the second or third route is used, an acid acceptor such as a tertiary amine can be employed to improve the yield and prevent side reactions. Pyridine appears to be particularly suitable although any art recognized acid acceptors can be used. Such processes are described in British Pat. No. 1,326,875.

The alkanoyl-N,N'-dialkyl-phenylenediamine compound can be incorporated either alone or in admixture with one another in any of the foam formulations of the type described, for example, in U.S. Pat. No. 4,143,219, which is incorporated herein by reference, in order to stabilize the polyurethane foam against scorching. The amount of such compound which is used can range from about 0.01% to about 5% by weight of the foam formulation, preferably from about 0.2% to about 3% by weight, of the formulation. Such foam formulations are prepared by mixing an organic isocyanate with a polyol compound which is, preferably, a polyol having a molecular weight in the range of from about 3000 to about 5600. Particularly preferred polyurethane foam formulations are those flexible and low density foams which contain such organophosphorus flame retardants as the homopolymerization product of tris (2-chloroethyl) phosphate, the copolycondensation product of bis (2-chloroethyl) vinylphosphate and dimethyl methylphosphonate, the copolycondensation product of tris (2-chloroethyl) phosphate and dimethyl methylphosphonate. Such products are described in U.S. Pat. Nos. 3,513,644, 3,641,202, 3,695,925, 3,822,327 and 3,855,359.

The present invention will be further illustrated by the Examples which follow:

EXAMPLE 1

A 2-liter flask fitted with a reflux condenser, to which a water trap was attached was charged with 200 milliliters of toluene, 110.2 grams of N,N'-di-sec-butyl-p-phenylenediamine and 65.1 grams of heptanoic acid. The flask was heated to reflux and was maintained at a pot temperature of 275° C. until 9 milliliters of water was formed. The condenser was removed and volatiles were collected off by maintaining the pot temperature at 230° C. The final product weighed 123 grams and was identified by I.R. spectra, gas chromatography, and n.m.r. to be N-heptanoyl-N,N'-di-sec-butyl-p-phenylenediamine.

EXAMPLE 2

The following foam formulation was prepared:

| REAGENT | AMOUNT |
| --- | --- |
| Toluene Diisocyanate | 1771.4 g |
| Polyol (CP 3000 sold by Dow Chemical Co.) | 3400 g |
| Condensed tris (2-chloroethyl) phosphate | 340 g |
| N—heptanoyl-N,N'—di-sec-butyl-p-phenylenediamine (Ex. 1) | 6.8 g |
| Silicone surfactant | 34 g |
| Niax A-1 initiator (Union Carbide) | 8.6 cc |
| Dioctyl phthalate | 12.4 cc |
| N—ethyl morpholine | 7.3 cc |
| Water | 136 g |

The above ingredients were premixed for 45 seconds after which the toluene diisocyanate was added. The resulting formulation was mixed for 9.5 seconds and was then poured into a large box. A recording probe was inserted into the foam at this time and recorded a maximum temperature of 144° C. The foam was allowed to remain for 22 hours and was then cut open. The inside of the foam showed only slight scorching.

EXAMPLE 3

The procedure reported in Example 2 was repeated with the exception that 68 grams (2% by weight based on the weight of polyol in the foam formulation) of N-heptanoyl-N,N'-di-sec-butyl-p-phenylenediamine and of N,N'-di-sec-butyl-p-phenylenediamine were incorporated in two separate foams, respectively. The foams were heated for one hour at about 150° C. The foam containing the N-heptanoyl-N,N'-di-sec-butyl-p-phenylenediamine showed considerably less scorch than the N,N'-di-sec-butyl-p-phenylenediamine containing foam.

EXAMPLE 4

A series of foams were formed and were tested according to ASTM--D1546, Method A, to determine the force (in lbs.) needed to produce 25% and 65% indentations in the foam product, i.e., the 25% indentation load deflection (ILD) and the 65% ILD values.

Foam A:

This foam formulation was one which did not contain flame retardant. The reagents used in making it were:

| REAGENT | AMOUNT* (in grams) |
| --- | --- |
| Polyol | 100 |
| Water | 4.0 |
| Silicone surfactant | 1.0 |
| Niax A-1 initiator (Union Carbide) | 0.175 |
| Dioctyl phthalate | 0.51 |
| Toluene Diisocyanate | 50.8 |

Foam B:

The same formulation described above was used with the addition of 10 g of condensed tris(2-chloroethyl) phosphate.

Foam C:

The formulation described for Foam B was used with the addition of 2 g of N-heptanoyl-N,N'-di-sec-butyl-p-phenylenediamine.

I.L.D. Test:

Indentation load deflection (ILD) tests were performed as prescribed in ASTM-D1546, Method A, to determine the force (in lbs.) needed to cause a 25% and a 65% indentation in Foams A-C. The Table sets forth the results:

| Foam | 25% ILD | 65% ILD |
| --- | --- | --- |
| A* | 32.3 lbs. | 67.5 lbs. |
| B** | 28.0 lbs. | 59.0 lbs. |
| C*** | 29.7 lbs. | 61.7 lbs. |

*contains no flame retardant and no scorch inhibitor.
**contains a flame retardant.
***contains a flame retardant and the scorch inhibitor according to this invention.

The scorch inhibitor used according to the present invention caused a 39.5% recovery at 25% ILD and a 31.8% recovery at 65% ILD as compared to the values recorded for Foam B containing just a flame retardant.

The foregoing Examples are intended to illustrate certain preferred embodiments of the claimed invention whose scope is set forth in the appended claims.

I claim:

1. A method for stabilizing a flame retarded polyurethane foam composition against scorching which comprises incorporating in said foam composition an effective amount of an N-alkanoyl-N,N'-dialkylphenylenediamine compound for scorch inhibition.

2. A method as claimed in claim 1 wherein the amount of phenylenediamine compound which is incorporated in the composition ranges from about 0.01% to about 5% by weight of the foam formulation.

3. A method as claimed in claim 1 wherein the composition is formed by the reaction of an organic isocyanate and a polyether polyol.

4. A method as claimed in claim 3 wherein the polyether polyol has an molecular weight which ranges from about 3000 to about 5600.

5. A method as claimed in claim 1 wherein the phenylenediamine compound has the formula:

$$(H)(R)NC_6H_4N(R)(COOR')$$

wherein R and R' are $C_1-C_{10}$ alkyl.

6. A method as claimed in any of claims 1-5 wherein the phenylenediamine compound is N-heptanoyl-N,N'-di-sec-butyl para-phenylenediamine.

7. A flame retarded polyurethane foam composition stabilized against scorching which contains an amount of an N-alkanoyl-N,N'-dialkylphenylenediamine compound effective for scorch inhibition.

8. A composition as claimed in claim 7 wherein the amount of phenylenediamine compound is from about 0.2% to about 3% by weight of the composition.

9. A composition as claimed in claim 7 wherein the composition is formed by the reaction of an organic isocyanate and a polyether polyol.

10. A composition as claimed in claim 9 wherein the polyether polyol has an molecular weight which ranges from about 3000 from about 5600.

11. A composition as claimed in claim 7 wherein the phenylenediamine compound has the formula $$(H)(R)NC_6H_4N(R)(COOR')$$

wherein R and R' are $C_1-C_{10}$ alkyl.

12. A composition as claimed in any of claims 7-11 wherein the phenylenediamine compound is N-heptanoyl-N,N'-di-sec-butyl para-phenylenediamine.

* * * * *

UNITED STATES PATENT AND TRADEMARK OFFICE
CERTIFICATE OF CORRECTION

PATENT NO. : 4,544,680
DATED : October 1, 1985
INVENTOR(S) : Barry A. Jacobs

It is certified that error appears in the above—identified patent and that said Letters Patent is hereby corrected as shown below:

Col. 1, line 8, "of" before "a method" should read -- to --;

Col. 3, line 15, delete the asterisk after the word "AMOUNT" in the heading of the Table of reagents;

Col. 4, line 18, change "an" to -- a -- before "molecular weight"; and

Col. 4, Line 41, insert -- to -- after "about 3000".

Signed and Sealed this

Seventeenth Day of December 1985

[SEAL]

Attest:

DONALD J. QUIGG

Attesting Officer

Commissioner of Patents and Trademarks